United States Patent
Lu et al.

(10) Patent No.: US 7,844,085 B2
(45) Date of Patent: Nov. 30, 2010

(54) PAIRWISE FEATURE LEARNING WITH BOOSTING FOR USE IN FACE DETECTION

(75) Inventors: Juwei Lu, Toronto (CA); Hui Zhou, Toronto (CA)

(73) Assignee: Seiko Epson Corporation, Tokyo (JP)

( * ) Notice: Subject to any disclaimer, the term of this patent is extended or adjusted under 35 U.S.C. 154(b) by 836 days.

(21) Appl. No.: 11/759,460

(22) Filed: Jun. 7, 2007

(65) Prior Publication Data

US 2008/0304714 A1 Dec. 11, 2008

(51) Int. Cl.
*G06K 9/00* (2006.01)
(52) U.S. Cl. .................................. 382/118; 382/224
(58) Field of Classification Search .................. 382/118
See application file for complete search history.

(56) References Cited

U.S. PATENT DOCUMENTS

| | | | | |
|---|---|---|---|---|
| 5,163,094 | A * | 11/1992 | Prokoski et al. | 382/118 |
| 5,574,573 | A * | 11/1996 | Ray et al. | 358/452 |
| 5,629,752 | A * | 5/1997 | Kinjo | 355/35 |
| 5,680,481 | A * | 10/1997 | Prasad et al. | 382/190 |
| 5,715,325 | A * | 2/1998 | Bang et al. | 382/118 |
| 5,850,470 | A * | 12/1998 | Kung et al. | 382/157 |
| 5,892,837 | A * | 4/1999 | Luo et al. | 382/117 |
| 6,463,163 | B1 | 10/2002 | Kresch | |
| 6,633,655 | B1 * | 10/2003 | Hong et al. | 382/118 |
| 7,024,033 | B2 * | 4/2006 | Li et al. | 382/159 |
| 7,050,607 | B2 | 5/2006 | Li et al. | |
| 7,099,510 | B2 * | 8/2006 | Jones et al. | 382/225 |
| 7,194,114 | B2 * | 3/2007 | Schneiderman | 382/118 |
| 7,379,568 | B2 * | 5/2008 | Movellan et al. | 382/118 |
| 7,471,812 | B2 * | 12/2008 | Cho et al. | 382/125 |
| 7,505,621 | B1 * | 3/2009 | Agrawal et al. | 382/159 |
| 7,508,961 | B2 * | 3/2009 | Chen et al. | 382/118 |
| 7,519,200 | B2 * | 4/2009 | Gokturk et al. | 382/118 |
| 7,587,069 | B2 * | 9/2009 | Movellan et al. | 382/118 |
| 7,643,659 | B2 * | 1/2010 | Cao et al. | 382/118 |
| 7,680,330 | B2 * | 3/2010 | Leung | 382/181 |
| 7,773,781 | B2 * | 8/2010 | Kim | 382/118 |

(Continued)

OTHER PUBLICATIONS

Liu, T., Zheng, N., Zhao, L., Cheng, H., "Learning based symmetric features selection for vehicle detection", Intelligent Vehicles Symposium, 2005. Proceedings. IEEE, pp. 124-129, ISBN: 0-7803-8961-1.*

(Continued)

*Primary Examiner*—Sath V Perungavoor
(74) *Attorney, Agent, or Firm*—Mark P. Watson (57) ABSTRACT

Systems and methods for training an AdaBoost based classifier for detecting symmetric objects, such as human faces, in a digital image. In one example embodiment, such a method includes first selecting a sub-window of a digital image. Next, the AdaBoost based classifier extracts multiple sets of two symmetric scalar features from the sub-window, one being in the right half side and one being in the left half side of the sub-window. Then, the AdaBoost based classifier minimizes the joint error of the two symmetric features for each set of two symmetric scalar features. Next, the AdaBoost based classifier selects one of the features from the set of two symmetric scalar features for each set of two symmetric scalar features. Finally, the AdaBoost based classifier linearly combines multiple weak classifiers, each of which corresponds to one of the selected features, into a stronger classifier.

18 Claims, 5 Drawing Sheets

U.S. PATENT DOCUMENTS

| | | | |
|---|---|---|---|
| 7,783,086 B2 * | 8/2010 | Sabe et al. | 382/118 |
| 7,792,335 B2 * | 9/2010 | Steinberg et al. | 382/118 |
| 2005/0102246 A1 * | 5/2005 | Movellan et al. | 706/12 |
| 2005/0213810 A1 | 9/2005 | Sabe et al. | |
| 2005/0220336 A1 | 10/2005 | Sabe et al. | |
| 2006/0050933 A1 * | 3/2006 | Adam et al. | 382/118 |
| 2006/0104517 A1 | 5/2006 | Ko et al. | |
| 2008/0008362 A1 * | 1/2008 | Hu | 382/118 |
| 2008/0304714 A1 * | 12/2008 | Lu et al. | 382/118 |

OTHER PUBLICATIONS

Viola, P., Jones, M.J., "Robust Real-Time Face Detection", International Journal of Computer Vision 57(2), pp. 137-154, 2004.*

* cited by examiner

FIG. 5

PAIRWISE FEATURE LEARNING WITH BOOSTING FOR USE IN FACE DETECTION

BACKGROUND

1. The Field of the Invention

The present invention relates to image processing. More specifically, the present invention relates to systems and methods for detecting objects, such as human faces, in a digital image.

2. The Relevant Technology

Computing systems are increasingly used for detecting objects in digital images. For example, some systems are configured to examine a photographic digital image and detect the size and location of any human face(s) within the image. At least one goal of such a detection system is to accurately detect desired object features (such as a face) in a digital image and distinguish those features from other objects in the digital image. Patterns in a digital image that correspond, for example, with a face vary extensively and are highly complex, due to the variations in facial appearance, lighting, expressions, and other factors. Such detection systems can consequently be prohibitively complex.

Some common challenges in digital image detection systems are low detection rates and high false detection rates. For example, a face detection system may fail to detect some faces in a digital image. The face detection system may also falsely identify non-face patterns in a particular digital image as faces.

SUMMARY

Example embodiments of the present invention include systems and methods for training a classifier for detecting symmetric objects, such as human faces, in a digital image using pairwise feature learning with boosting. For example, current embodiments provide the ability to train an AdaBoost-based classifier to accurately detect symmetric objects, such as human faces, in digital images with high detection rates and low false detection rates.

In one embodiment, a method for training an AdaBoost based classifier for detecting an object—such as a face—in a digital image includes first selecting a sub-window of a digital image. Next, the AdaBoost based classifier extracts multiple sets of two symmetric scalar features from the sub-window. Then, the AdaBoost based classifier minimizes the joint error of the two symmetric features for each set of two symmetric scalar features. Next, the AdaBoost based classifier selects one of the features from the set of two symmetric scalar features for each set of two symmetric scalar features. Finally, the AdaBoost based classifier linearly combines multiple weak classifiers, each of which corresponds to one of the selected features, into a stronger classifier.

Additional aspects will be set forth in the description which follows, and in part will be obvious from the description, or may be learned by the practice of the teachings herein. Aspects of the invention may be realized and obtained by means of the instruments and combinations particularly pointed out in the appended claims. Aspects of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are disclosed in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION OF EXAMPLE EMBODIMENTS

As noted above, example embodiments of the invention relate to systems and methods for training an AdaBoost based classifier for detecting symmetric objects, such as human faces, in a digital image using pairwise feature learning with boosting. Current embodiments provide the ability to accurately detect symmetric objects, such as human faces, in digital images with high detection rates and low false detection rates.

I. An Example Method for Detecting Faces in a Digital Image

Figure 1:
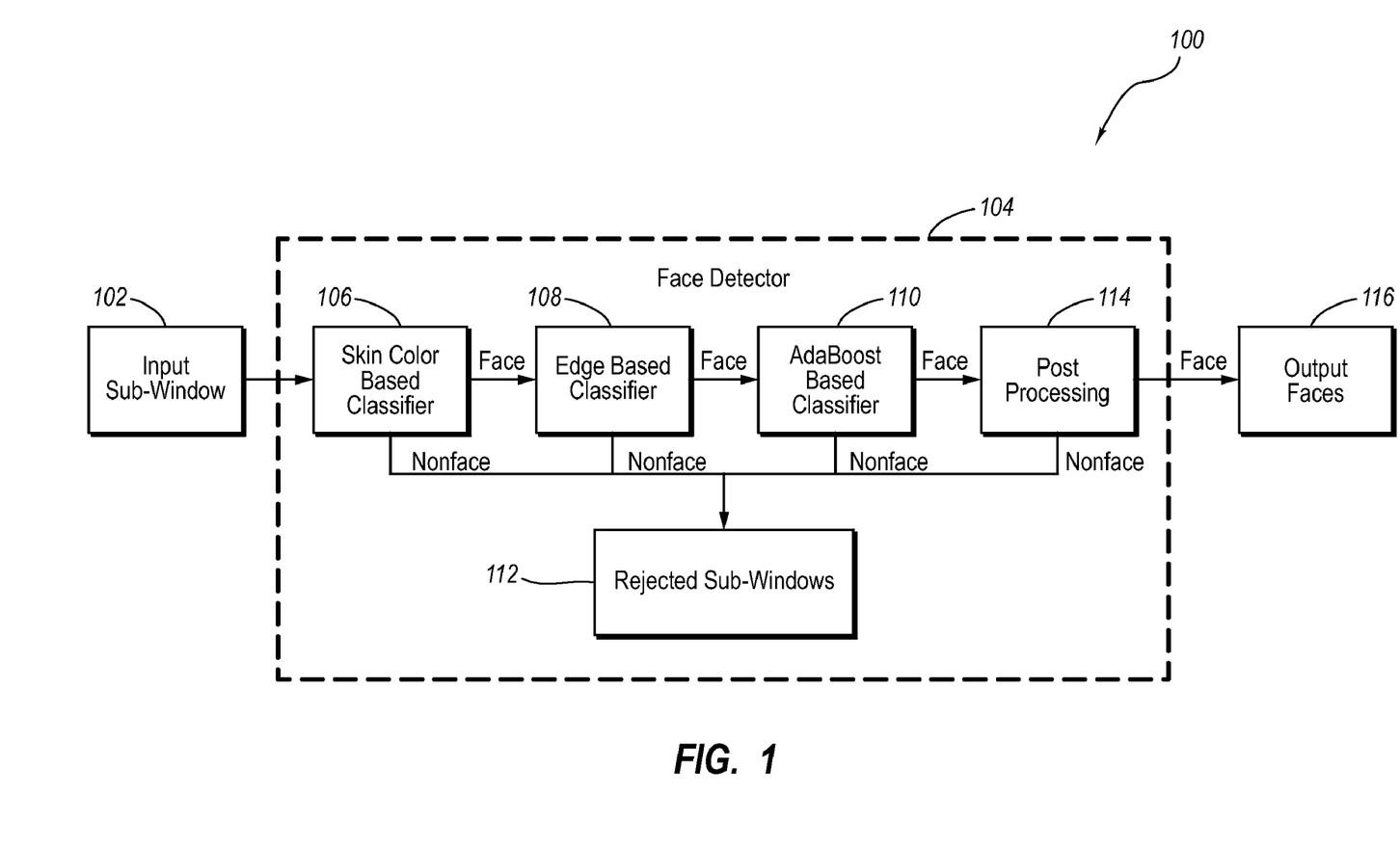
FIG. 1 discloses an example system and method for face detection.

An example method 100 for detecting faces in a digital image will now be disclosed in connection with FIG. 1. Prior to performing the method 100, an input image I is scanned exhaustively at various locations (u, v) and scales s, resulting in multiple sub-windows x=x(u, v, s|I), where u and v represent the horizontal and vertical offset, in pixels, from the upper left corner of the image I, and s represents the scale of the sub-window x.

At 102, a sub-window x is input into a face detector 104. In a first stage 106, the face detector 104 analyzes the color of the pixels in the sub-window x using a skin color based classifier. In a second stage 108, the face detector 104 analyzes the edge magnitude of the pixels in the sub-window x using an edge based classifier. During a third stage 110, the face detector 104 employs an AdaBoost-like technique using an AdaBoost based classifier. If the face detector 104 determines during any of the stages 106-110 that the sub-window x does not represent a face, the analysis of the sub-window x terminates and the sub-window x is rejected at 112. Thus, if the sub-window x is deemed to be a non-face at any of the stages 106-110, further processing resources and time are not wasted in connection with any further analysis of the sub-window x. If, instead, the face detector 104 determines at each of the stages 106-110 that the sub-window x likely contains a face, then the sub-window x is deemed to represent a face and undergoes post-processing at 114. Stage 114 involves further processing of the sub-window x that results in a determination that the sub-window x is or is not a face. In one example embodiment, the stages 106-110 and 114 have increasing processing costs and levels of discernment.

Figure 2:
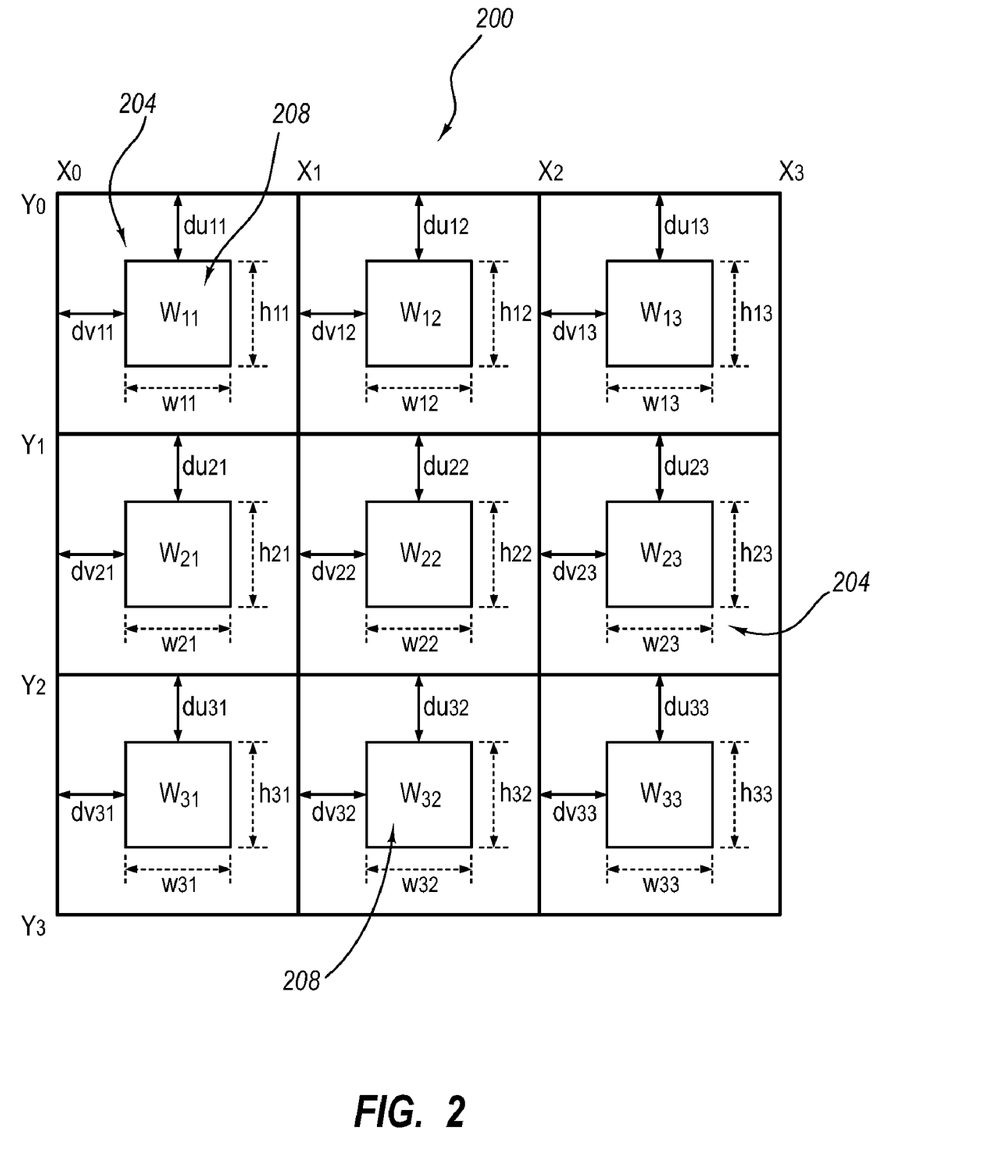
FIG. 2 discloses an example prototype template of a 3×3 rectangular feature.

With reference now to FIG. 2, an example prototype template 200 of a three-by-three rectangular feature is disclosed. The prototype template 200 is divided into nine frames 204 in a three-by-three array, and within each frame a sample region 208 is located. The prototype template 200 is shown spanning the horizontal range from $X_0$ to $X_3$, and the vertical range from $Y_0$ to $Y_3$. The locations and dimensions of the nine rectangular sample regions, $\{W_{ij}\}_{i,j=1}^{3}$, are controlled by the following set of variables:

- $\{X_k\}_{k=0}^{3}$, the x-coordinate of each dividing line between frames,
- $\{Y_k\}_{k=0}^{3}$, the y-coordinate of each dividing line between frames,
- $\{du_{ij}\}_{i,j=1}^{3}$, the vertical offset of the sample region from the top of each frame,
- $\{dv_{ij}\}_{i,j=1}^{3}$, the horizontal offset of the sample region from the top of each frame,
- $\{w_{ij}\}_{i,j=1}^{3}$, the width of each sample region, and
- $\{h_{ij}\}_{i,j=1}^{3}$, the height of each sample region.

In one example embodiment, the heights and widths of each frame are generally equal, as are the heights and widths of each sample region within each frame.

Figure 3:
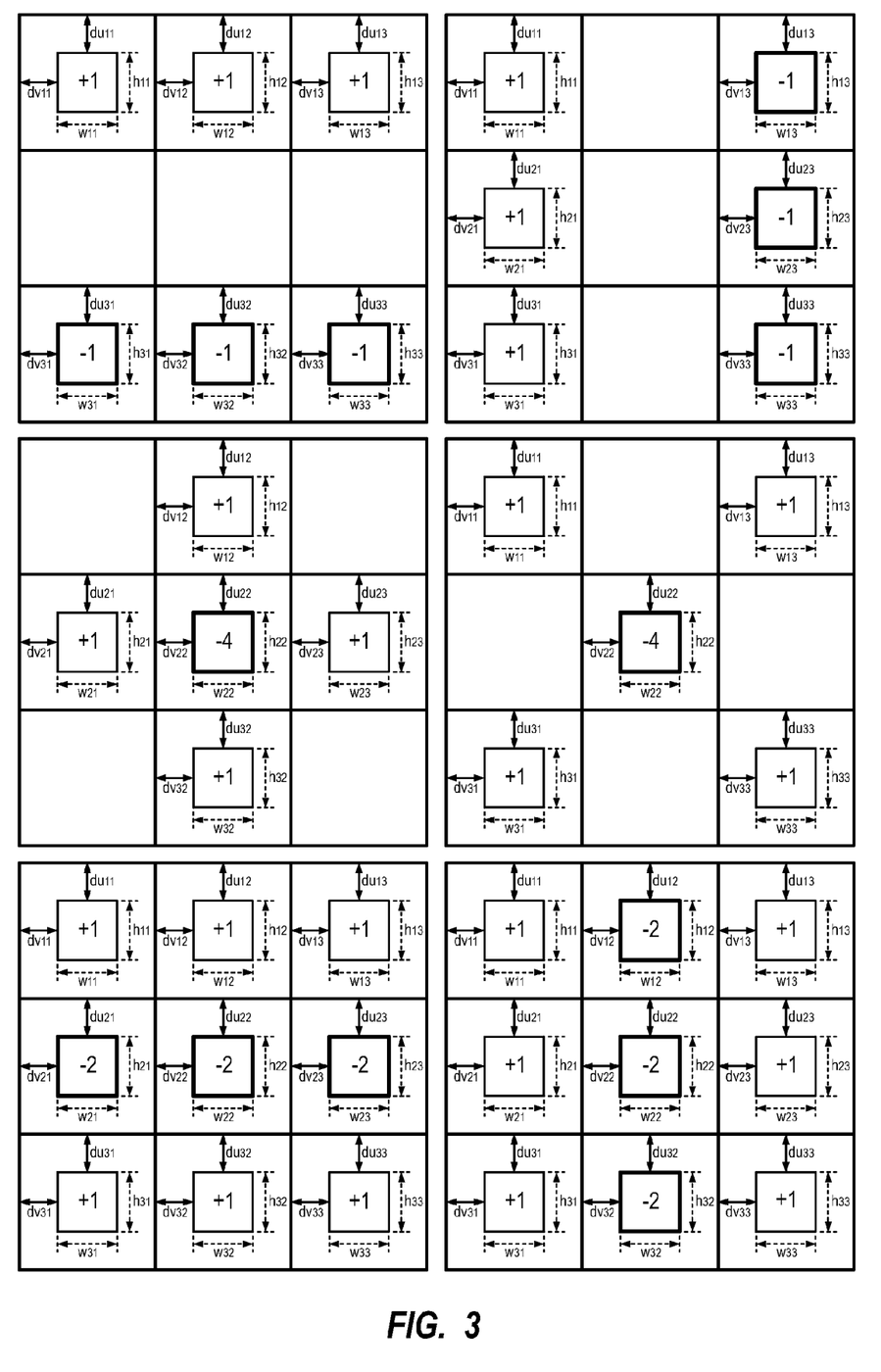
FIG. 3 discloses several example features generated using the example prototype template of FIG. 2.
Figure 4:
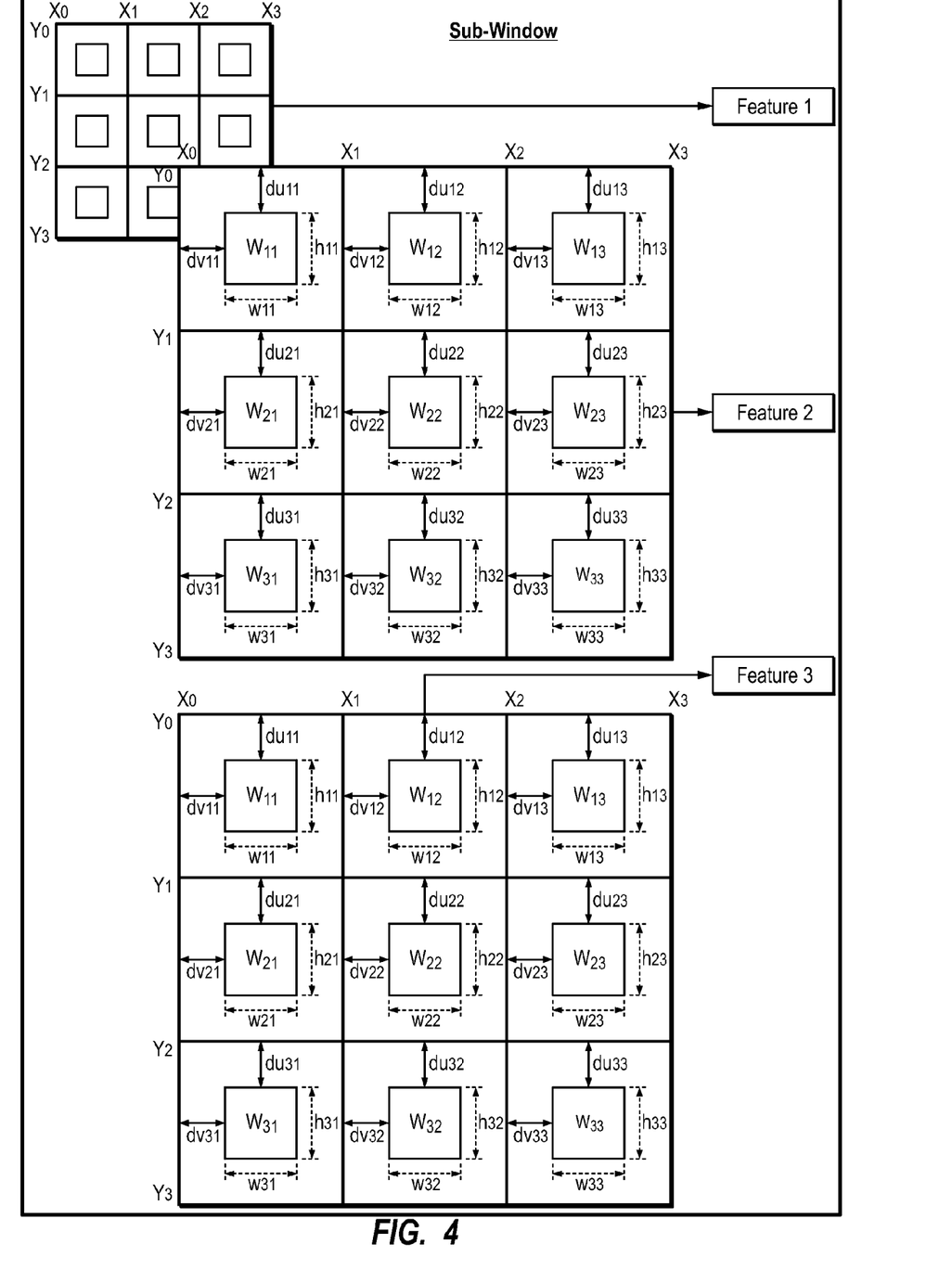
FIG. 4 discloses the relationship between a sub-window and three example features generated using the example prototype template of FIG. 2.

A scalar weighting, $B_{ij} \in R$, to be applied to each sample region $\{W_{ij}\}_{i,j=1}^{3}$ is then determined. A scalar feature of the prototype template 200 can then be computed by a linearly weighted combination of the sums of values of the pixels of the nine sample regions; that is, $$f_n(\vartheta) = \sum_{i=1}^{3} \sum_{j=1}^{3} B_{ij} \cdot \text{sum}(W_{ij}),\quad \text{(Equation 1)}$$

where:

$$\theta = \{\{X_k\}_{k=0}^{3}, \{Y_k\}_{k=0}^{3}, \{du_{ij}\}_{i,j=1}^{3}, \{dv_{ij}\}_{i,j=1}^{3}, \{w_{ij}\}_{i,j=1}^{3}, \{h_{ij}\}_{i,j=1}^{3}, \{B_{ij}\}_{i,j=1}^{3}\}$$

is the set of all the variables, and sum($W_{ij}$) denotes the sum across all pixels of the sample region $W_{ij}$. The function sum ($W_{ij}$) can be computed efficiently from a summed-area table, such as described in "Summed-area tables for texture mapping", F. Crow, SIGGGRAPH, 1984, vol. 18(3), pp. 207-212, which is expressly incorporated herein by reference. Alternatively, the function sum($W_{ij}$) can be computed efficiently from an integral image, such as described in "Robust real-time face detection", Paul Viola and Michael J. Jones, *International Journal of Computer Vision*, vol. 57, May 2004, pp. 137-154, which is expressly incorporated herein by reference. By varying the values of θ, various scalar features can be generalized from an image I. For a sub-window x of size 20×20 pixels, billions of such features can be generalized. These features form an over-complete feature set for the sub-window x. Some examples of this over-complete feature set are disclosed in FIG. 3. FIG. 4 discloses a sub-window x with three example features generalized from the prototype template 200.

Because billions of scalar feature can be computed from a single sub-window x, it is intractable to compute the entire set of scalar features. Fortunately, only a very small fraction of the set is needed for face detection tasks. The most significant features can be found by using the so-called AdaBoost learning method. Considering that a face is a symmetric object, one example embodiment of the present invention implements a pairwise feature selection method using a variant of the Ada-Boost method, called gentle AdaBoost.

The example method 100 and other example methods disclosed herein can be implemented using computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described herein are disclosed as example forms of implementing the claims.

II. Learning Feature Selection with Gentle AdaBoost

The AdaBoost based classifier 110 of FIG. 1 can be trained and configured in order to effectively distinguish between face and non-face sub-windows. To this end, a set of N labeled training examples can be defined as $(x_1, y_1), \ldots, (x_N, y_N)$, where $y_j \in \{+1,-1\}$ is the class label for the example $x_j \in R^n$. AdaBoost-based methods assume that a procedure is available for learning a sequence of weak classifiers $h_m(x)$ (m=1, 2, . . . , M) from the training examples, with respect to the distributions $w_j^{(m)}$ of the examples. In general, a weak classifier $h_m(x)$ is associated with a single scalar feature $f_i$. Thus, to find the best new weak classifier is equivalent to choose the best corresponding scalar feature. A stronger classifier is a linear combination of the M weak classifiers $$H_M(x) = \sum_{m=1}^{M} h_m(x) - \theta_b \quad \text{(Equation 2)}$$

where $\theta_b$ is the threshold controlling the tradeoff of detection rate and false positive rate. The classification of a sub-window x is obtained as $\hat{y}(x) = \text{sign}[H_M(x)]$ and the normalized confidence score is $|H_M(x)|$. The original form of $h_m(x)$ is a discrete function. However, many AdaBoost variants that use real $h_m(x)$ have been also developed. In one example embodiment, the so-called gentle AdaBoost can be used. The gentle Ada-Boost variant is targeted at minimizing the following weighted least square error, $$E(f_i) = \sum_{j=1}^{N} w_j (h_m(f_i, x_j) - y_j)^2 \quad \text{(Equation 3)}$$

where $$h_m(f_i, x_j) = \begin{cases} v_i, & \text{if } f_i \geq \theta_i \\ \mu_i, & \text{otherwise} \end{cases}, \quad \text{(Equation 4)}$$

$$v_i = \frac{W_+^r - W_-^r}{W_+^r + W_-^r}, \quad \text{(Equation 5)}$$

$$\mu_i = \frac{W_+^l - W_-^l}{W_+^l + W_-^l}, \quad \text{(Equation 6)}$$

$$W_+^r = \sum_{j:(y_j=-1)\&(f_i(x_j)\geq\theta_i)} w_j, \quad \text{(Equation 7)}$$

$$W_-^r = \sum_{j:(y_j=1)\&(f_i(x_j)<\theta_i)} w_j, \quad \text{(Equation 8)}$$

$$W_+^l = \sum_{j:(y_j=1)\&(f_i(x_j)\geq\theta_i)} w_j, \quad \text{(Equation 9)}$$

$$W_-^l = \sum_{j:(y_j=-1)\&(f_i(x_j)<\theta_i)} w_j, \quad \text{(Equation 10)}$$

The optimal parameters of $h_m$ together with the best feature $f^*$ can be determined by minimizing the error of Equation 2, $$f_* = \underset{f_i}{\arg\min} E(f_i) \quad \text{(Equation 11)}$$

III. Pairwise Symmetric Feature Learning and Regularization

Figure 5:
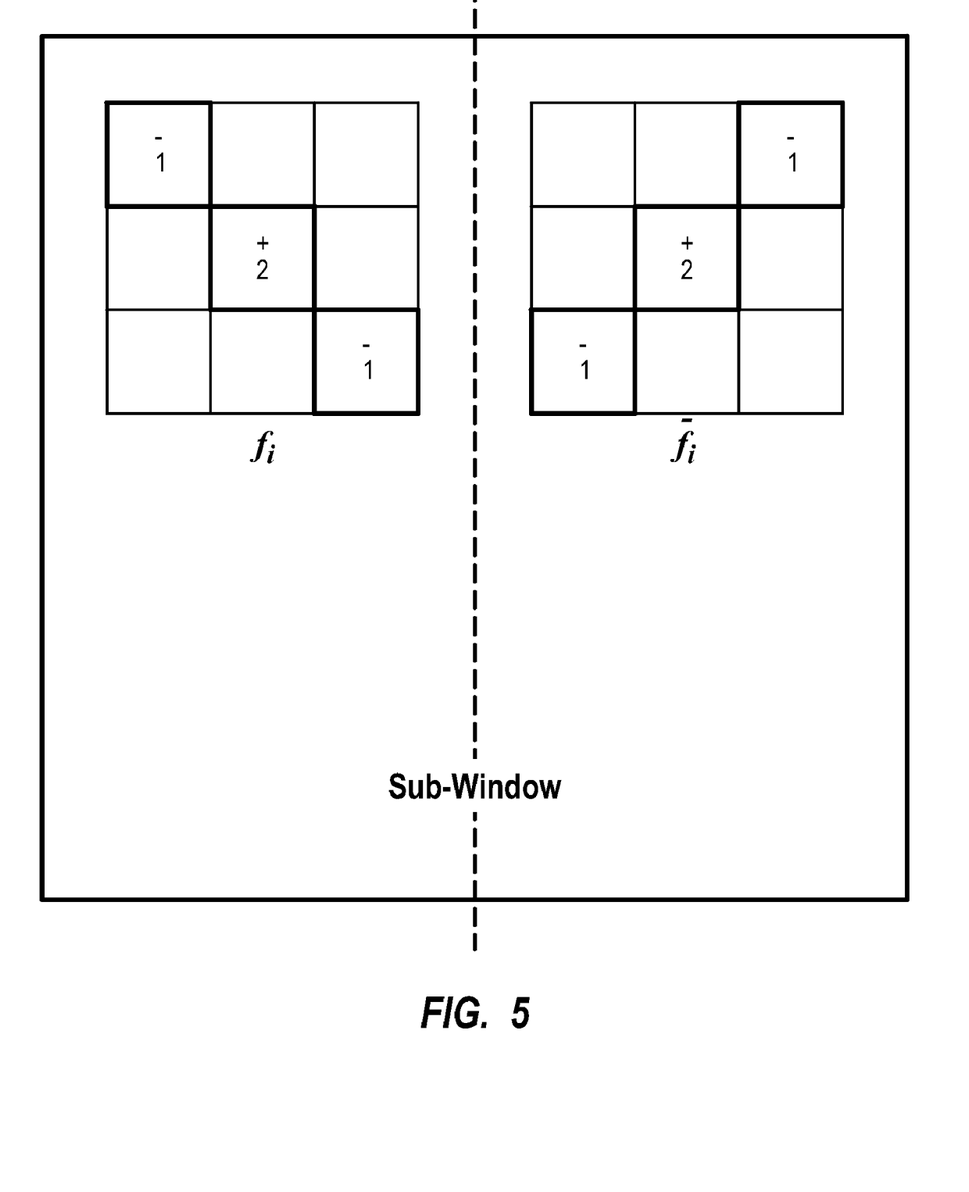
FIG. 5 discloses an example pair of features which are symmetric along the vertical middle line of a sub-window

To enhance the generalization power of the weak classifiers, $h_m(f_i, x_j)$, one example embodiment of the present invention uses a pairwise feature selection strategy during the boosting learning process. This pairwise feature selection strategy takes advantage of the symmetric property of human faces. As disclosed in FIG. 5, a pair of symmetric scalar features, $(f_i, \bar{f}_i)$, can be extracted from a sub-window x are as shown in FIG. 5. In general, the nonface training sets disclosed above are not symmetric. Thus, the two weak classifiers $h_m(f_i, x_j)$ and $h_m(\bar{f}_i, x_j)$ created by boosting based on $f_i$ and $\bar{f}_i$, respectively, are different in terms of discriminant power. It can be difficult to predict which classifier is better in advance. A tradeoff solution is to merge the two classifiers by a regularization method. To this end, assume that $\{v_i, \mu_i, \theta_i\}$ and $\{\bar{v}_i, \bar{\mu}_i, \bar{\theta}_i\}$ are two sets of parameters corresponding to the two weak classifiers $h_m(f_i, x_j)$ and $h_m(\bar{f}_i, x_j)$, respectively. Instead of Equation 2, in one example embodiment, the following joint error is minimized, $$E(f_i, \bar{f}_i) = \frac{1}{2}(E(f_i) + E(\bar{f}_i)) \quad \text{(Equation 12)}$$

Thus, the optimal pair of features, $(f^*, \bar{f}^*)$, can be determined by $$(f_*, \bar{f}_*) = \underset{f_i, \bar{f}_i}{\arg\min} E(f_i, \bar{f}_i) \quad \text{(Equation 13)}$$

To reduce the computational complexity of final ensemble classifier, in one example embodiment only one feature is selected from $(f^*, \bar{f}^*)$ for the use of building the current weak classifier, $h_m$ (see Equation 4). One of at least three example feature selection method can be implemented. The first method involves randomly selecting one feature between $(f^*, \bar{f}^*)$. The second method involves selecting according to the locations of features in the left or right half side of sub-window. In one embodiment, different halves of features may be selected in every two neighboring iterations of the method. For example, if the feature falling in the right side of sub-window in the m-th iteration is generally selected, then an alternate order of left, right, left, right . . . feature may be selected in the following iterations. The third method involves selecting feature which have a smaller error. For example, $f^*$ is selected if $E(f^*)<E(\bar{f}^*)$, and $\bar{f}^*$ is selected otherwise.

Assuming that in one embodiment that $f^*$ is the chosen feature at current boosting iteration, the parameters of $h_m(f^*)$ can be updated by, $$\mu^* = (1-\eta) \cdot \mu^* + \eta \bar{\mu}^*, \quad \text{(Equation 14)}$$

$$v^* = (1-\eta) \cdot v^* + \eta \bar{v}^*, \quad \text{(Equation 15)}$$

$$\theta^* = (1-\eta) \cdot \theta^* + \eta \bar{\theta}^*, \quad \text{(Equation 16)}$$

where $\eta$ is a regularization parameter taking values in [0,1]. The updated $h_m(f^*)$ is can then be used in the subsequent boosting iterations. The introduction of regularization leads to more accurate estimates of the weak classifiers $h_m(f^*)$, and may significantly improve the generalization power of the final ensemble classifier, $H_M(x)$ (see Equation 2).

The selection of the optimal $\eta$ value can be dependent on the input training data. Generally, a bigger $\eta$ value produces a more accurate strong classifier. However, it also makes the boosting learning process difficult to converge. This can result in an undesirably large final ensemble classifier. Therefore, the accuracy and the size of the final classifier may need to be balanced. It is experimentally observed that good results can be obtained by setting $\eta = 0.1 \sim 0.4$.

Disclosed herein are example systems and methods for training an AdaBoost based classifier for detecting symmetric objects, such as human faces, in a digital image using pairwise feature learning with boosting. Compared to single feature based solutions, the example embodiments disclosed herein can in some cases result in more accurate results. Although example embodiments have been disclosed in connection with a gentle AdaBoost based classifier, alternative embodiments may be implemented with a discrete AdaBoost based classifier or a real AdaBoost based classifier.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for detecting an object using an AdaBoost based classifier, such as a face, in a digital image, the method comprising the following acts:
   selecting a sub-window of a digital image from a set of training sub-windows that are labeled as face or non-face sub-windows;
   extracting multiple sets of two symmetric scalar features from the sub-window;
   minimizing the joint error of the two symmetric features for each set of two symmetric scalar features;

selecting one of the features from the set of two symmetric scalar features for each set of two symmetric scalar features; and linearly combining multiple weak classifiers, each of which corresponds to one of the selected features, into a stronger classifier.

2. The method as recited in claim 1, wherein the act of minimizing the joint error of the two symmetric features comprises minimizing the joint error, $E(f_i, \bar{f}_i)$, of the two symmetric features, $(f_i, \bar{f}_i)$, in accordance with Equation 12, in order to arrive at the optimal pair of features, $(f^*, \bar{f}^*)$, in accordance with Equation 13.

3. The method as recited in claim 1, wherein the act of selecting one of the features from the set of two symmetric scalar features comprises randomly selecting one of the features from the set of two symmetric scalar features.

4. The method as recited in claim 1, wherein the act of selecting one of the features from the set of two symmetric scalar features comprises selecting one of the features from the set of two symmetric scalar features according to the locations of features in the left or right half side of the sub-window.

5. The method as recited in claim 4, wherein the act of selecting one of the features from the set of two symmetric scalar features according to the locations of features in the left or right half side of the sub-window comprises selecting alternating left and right half side features.

6. The method as recited in claim 1, wherein the act of selecting one of the features from the set of two symmetric scalar features comprises selecting one of the features from the set of two symmetric scalar features according to which feature has the smaller error.

7. The method as recited in claim 1, wherein the AdaBoost based classifier is a gentle AdaBoost based classifier.

8. The method as recited in claim 1, wherein the AdaBoost based classifier is a discrete AdaBoost based classifier.

9. The method as recited in claim 1, wherein the AdaBoost based classifier is a real AdaBoost based classifier.

10. One or more non-transitory computer-readable media having computer-readable instructions thereon which, when executed, implement a method for training an AdaBoost based classifier for detecting faces in a digital image, the method comprising the following acts:

selecting a sub-window of a digital image from a set of training sub-windows that are labeled as face or non-face sub-windows;

extracting multiple sets of two symmetric scalar features from the sub-window, one being in the right half side and one being in the left half side of the sub-window;

minimizing the joint error of the two symmetric features for each set of two symmetric scalar features;

selecting one of the features from the set of two symmetric scalar features for each set of two symmetric scalar features; and linearly combining multiple weak classifiers, each of which corresponds to one of the selected features, into a stronger classifier.

11. The one or more computer-readable media recited in claim 10, wherein the act of minimizing the joint error of the two symmetric features comprises minimizing the joint error, $E(f_i, \bar{f}_i)$, of the two symmetric features, $(f_i, \bar{f}_i)$, in accordance with Equation 12, in order to arrive at the optimal pair of features, $(f^*, \bar{f}^*)$, in accordance with Equation 13.

12. The one or more computer-readable media recited in claim 10, wherein the act of selecting one of the features from the set of two symmetric scalar features comprises randomly selecting one of the features from the set of two symmetric scalar features.

13. The one or more computer-readable media recited in claim 10, wherein the act of selecting one of the features from the set of two symmetric scalar features comprises selecting one of the features from the set of two symmetric scalar features according to the locations of features in the left or right half side of the sub-window.

14. The one or more computer-readable media recited in claim 13, wherein the act of selecting one of the features from the set of two symmetric scalar features according to the locations of features in the left or right half side of the sub-window comprises selecting alternating left and right half side features.

15. The one or more computer-readable media recited in claim 10, wherein the act of selecting one of the features from the set of two symmetric scalar features comprises selecting one of the features from the set of two symmetric scalar features according to which feature has the smaller error.

16. The one or more computer-readable media recited in claim 10, wherein the AdaBoost based classifier is a gentle AdaBoost based classifier.

17. The one or more computer-readable media recited in claim 10, wherein the AdaBoost based classifier is a discrete AdaBoost based classifier.

18. The one or more computer-readable media recited in claim 10, wherein the AdaBoost based classifier is a real AdaBoost based classifier.

* * * * *